United States Patent
Oomura et al.

(10) Patent No.: US 10,143,263 B2
(45) Date of Patent: Dec. 4, 2018

(54) SHOE-FORMING MEMBER, METHOD FOR PRODUCING SHOE-FORMING MEMBER, AND SHOE

(71) Applicant: ASICS CORPORATION, Kobe-shi (JP)

(72) Inventors: Takashi Oomura, Kobe (JP); Yasuhiro Otsuka, Kobe (JP); Kenichi Harano, Kobe (JP)

(73) Assignee: ASICS CORPORATION (JP)

( * ) Notice: Subject to any disclaimer, the term of this patent is extended or adjusted under 35 U.S.C. 154(b) by 0 days.

(21) Appl. No.: 15/301,333

(22) PCT Filed: Mar. 31, 2014

(86) PCT No.: PCT/JP2014/059474
§ 371 (c)(1),
(2) Date: Sep. 30, 2016

(87) PCT Pub. No.: WO2015/151164
PCT Pub. Date: Oct. 8, 2015

(65) Prior Publication Data
US 2017/0013910 A1    Jan. 19, 2017

(51) Int. Cl.
| | | |
|---|---|---|
| *C08L 9/00* | (2006.01) |
| *C08K 5/00* | (2006.01) |
| *A43B 13/04* | (2006.01) |
| *A43B 13/12* | (2006.01) |
| *C08L 9/06* | (2006.01) |

(52) U.S. Cl.
CPC .............. *A43B 13/04* (2013.01); *A43B 13/12* (2013.01); *A43B 13/122* (2013.01); *C08L 9/00* (2013.01); *C08L 9/06* (2013.01); *C08L 2205/02* (2013.01)

(58) Field of Classification Search
None
See application file for complete search history.

(56) References Cited

FOREIGN PATENT DOCUMENTS

| EP | 2 489 496 A1 | 8/2012 |
| JP | H11-155604 A | 6/1999 |
| JP | 2004-329518 A | 11/2004 |
| JP | 2005002225 A | 1/2005 |
| JP | 2005008650 A | 1/2005 |
| JP | 2006020656 A | 1/2006 |
| WO | WO-2008/041631 A1 | 4/2008 |

OTHER PUBLICATIONS

International Search Report Issued in PCT/JP2014/059474 dated Jun. 24, 2016.
Extended European Search Report for European Patent Application No. 1488058.6 dated Oct. 30, 2017.

*Primary Examiner* — Ana L. Woodward
(74) *Attorney, Agent, or Firm* — Katten Muchin Rosenman LLP (57) ABSTRACT

There is provided a shoe-forming member comprising a rubber composition containing a styrene-butadiene rubber, a butadiene rubber, silica, a silane coupling agent, and a crosslinking agent, the rubber composition being crosslinked, wherein the rubber composition contains specific materials as the silane coupling agent and the crosslinking agent, and the butadiene rubber and the styrene-butadiene rubber are contained in the rubber composition in predetermined proportions.

6 Claims, 2 Drawing Sheets

AMOUNT OF SBR BLENDED (PARTS) BASED ON 100 PARTS OF (SBR+BR)

Fig. 3

AMOUNT OF SBR BLENDED (PARTS) BASED ON 100 PARTS OF (SBR+BR)

SHOE-FORMING MEMBER, METHOD FOR
PRODUCING SHOE-FORMING MEMBER,
AND SHOE

CROSS-REFERENCES TO RELATED
APPLICATIONS

This patent application is a U.S. National Phase application under 37 U.S.C. § 371 of Patent Cooperation Treaty Application No. PCT/JP2014/059474, filed on Mar. 31, 2014, entitled "MEMBER FOR SHOEMAKING, PROCESS FOR PRODUCING MEMBER FOR SHOEMAKING, AND SHOES," the contents of which are incorporated herein by reference in entirety.

BACKGROUND OF THE INVENTION

Field of the Invention

The present invention relates to a shoe-forming member, a method for producing a shoe-forming member, and a shoe, and more specifically relates to a shoe-forming member comprising a rubber composition containing a crosslinking agent, the rubber composition being crosslinked, a method for producing the shoe-forming member, and a shoe comprising the shoe-forming member as described above.

BACKGROUND ART

Conventionally, in sports shoes and the like, shoe-forming members comprising a crosslinked rubber obtained by a crosslinked rubber composition containing a crosslinking agent have been frequently used.

Especially, the shoe-forming members comprising a crosslinked rubber have been widely employed as shoe-forming members such as outer soles having a low hardness which require excellent grip properties.

Incidentally, in sports shoes and the like, transparent members as shown in Patent Literature 1 below may be employed as shoe-forming members from a point of view of design and the like.

However, conventional shoe-forming members comprising a crosslinked rubber have the following problem: it is difficult to impart transparency to shoe-forming members for indoor games in combination with strength, hardness, and grip properties, which are generally required for shoe-forming members for indoor games.

CITATION LIST

Patent Literature

Patent Literature 1: Japanese Patent Laid-Open No. Hei-11-155604

SUMMARY OF THE INVENTION

Technical Problem

An object of the present invention is to solve the problem as described above, and to provide a shoe-forming member having not only excellent strength and low hardness but also excellent transparency and, as a result, to provide a shoe excellent in strength and design.

Solution to Problem

The present invention according to a shoe-forming member for solving the above problem is a shoe-forming member comprising a rubber composition containing a butadiene rubber, a styrene-butadiene rubber, silica, a silane coupling agent, and a crosslinking agent, the rubber composition being crosslinked, wherein the content of the butadiene rubber in the rubber composition is 60 parts by mass or more and 80 parts by mass or less based on 100 parts by mass of the total of the butadiene rubber and the styrene-butadiene rubber; the silane coupling agent contained in the rubber composition is one or more selected from the group consisting of a mercapto silane coupling agent and a monosulfide silane coupling agent; and the crosslinking agent is an organic peroxide crosslinking agent.

Further, the present invention according to a method for producing a shoe-forming member for solving the above problem is a method for producing a shoe-forming member, comprising: preparing a rubber composition containing a butadiene rubber, a styrene-butadiene rubber, silica, a silane coupling agent, and a crosslinking agent, followed by allowing the rubber composition to form the shape of the member and crosslinking the rubber composition to produce the shoe-forming member, wherein the content of the butadiene rubber in the rubber composition is 60 parts by mass or more and 80 parts by mass or less based on 100 parts by mass of the total of the butadiene rubber and the styrene-butadiene rubber; the silane coupling agent contained in the rubber composition is one or more selected from the group consisting of a mercapto silane coupling agent and a monosulfide silane coupling agent; and the crosslinking agent is an organic peroxide crosslinking agent, and wherein the preparation of the rubber composition comprises: a first kneading step of kneading a first mixture containing the butadiene rubber, the styrene-butadiene rubber, the silica, and the silane coupling agent; and a second kneading step of kneading a second mixture containing the kneaded material obtained in the first kneading step and the crosslinking agent.

Furthermore, the present invention according to a shoe for solving the above problem is a shoe comprising the shoe-forming member as described above with a surface thereof exposed.

Advantageous Effect of Invention

The shoe-forming member of the present invention is formed of a rubber composition containing predetermined components, and thereby is capable of exhibiting not only excellent strength and low hardness but also excellent transparency.

DETAILED DESCRIPTION OF THE PREFERRED EMBODIMENT

The shoe-forming member of the present invention will be described while illustrating the embodiments thereof below.

Figure 1:
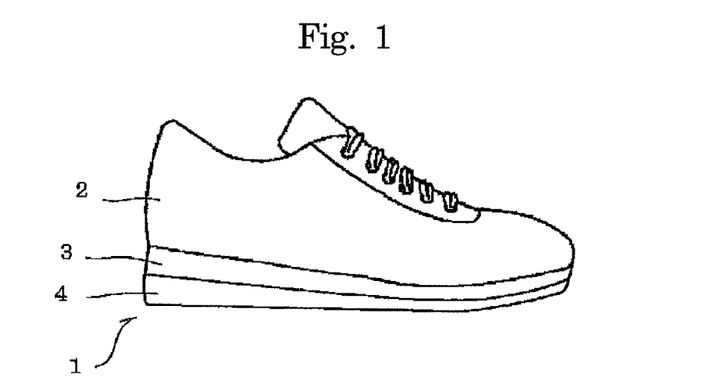
FIG. 1 is a schematic view showing one example of a shoe in which a shoe-forming member according to an embodiment is utilized.

FIG. 1 shows a shoe comprising the shoe-forming member of the present embodiment.

The shoe 1 has an upper material 2 and sole members 3 and 4.

The shoe 1 has a midsole 3 and an outer sole 4 as the sole members.

Specifically, the shoe-forming member of the present embodiment preferably constitutes the whole or a part of the outer sole.

In other words, the shoe of the present embodiment preferably comprise the shoe-forming member with its surface exposed on the side or the sole of the shoe.

The shoe-forming member is transparent and has the mechanical strength required for the outer sole and the like.

Note that the term "transparent" herein is used not in the narrow sense of "transparent and colorless" but in a broader sense including "colored transparent" and "semi-transparent" or "translucent".

The shoe-forming member is formed of a crosslinked rubber formed by crosslinking a rubber composition containing a butadiene rubber, a styrene-butadiene rubber, silica, a silane coupling agent, and a crosslinking agent.

The styrene-butadiene rubber is an essential component of the rubber composition for allowing shoe-forming members to exhibit transparency.

Further, if the rubber to be contained in the rubber composition is only a styrene-butadiene rubber, it will be difficult to allow shoe-forming members to exhibit sufficient strength.

Therefore, in the present embodiment, a butadiene rubber is contained in the rubber composition together with the styrene-butadiene rubber.

More specifically, in order to allow the shoe-forming members to exhibit excellent strength and excellent transparency with good balance, the content of the butadiene rubber in the rubber composition is 60 parts by mass or more and 80 parts by mass or less based on 100 parts by mass of the total of the butadiene rubber and the styrene butadiene rubber.

For example, a butadiene rubber having a number average molecular weight of about 10000 to 500000 can be employed as the butadiene rubber in the present embodiment.

Further, the butadiene rubber may be, for example, a low-cis type rubber, in which the main component of the molecular structure is trans-1,4 units with the balance consisting of 1,2 units (vinyl units) and cis-1,4 units, or may be a so-called high-cis type rubber, in which 80% or more of the molecular structure is cis-1,4 units. The high-cis type rubber is particularly preferred.

Further, the butadiene rubbers in the present embodiment may be contained in the rubber composition singly or in combinations of two or more.

Other examples of the butadiene rubber which may be contained in the rubber composition than the above common butadiene rubber include butadiene rubbers in which functional groups, such as a hydroxy group, a carboxyl group, an acrylic group, and an isocyanate group, are introduced into a molecular terminal.

With respect to the styrene-butadiene rubber contained in the rubber composition together with the butadiene rubber, the structural unit thereof is not particularly limited, and a common styrene-butadiene rubber such as a copolymer of styrene and 1,3-butadiene can be employed.

With respect to the styrene-butadiene rubber, the method for producing the same is not particularly limited, and a styrene-butadiene rubber obtained by emulsion polymerization or solution polymerization can be employed. A styrene-butadiene rubber obtained by solution polymerization is particularly preferred.

Incorporation of a styrene-butadiene rubber having a high styrene content into the rubber composition is advantageous for allowing a shoe-forming member to exhibit excellent strength, while when the styrene-butadiene rubber having a high styrene content is contained in the rubber composition, it will be difficult to allow a shoe-forming member to exhibit excellent transparency.

Therefore, the styrene-butadiene rubber contained in the rubber composition together with the butadiene rubber preferably has a styrene content determined according to JIS K6239 of 30% by mass or more and 60% by mass or less, most preferably 40% by mass or more and 50% by mass or less.

Further, a styrene-butadiene rubber obtained by a solution polymerization method is more preferred than that obtained by an emulsion polymerization method.

The styrene-butadiene rubber obtained by a solution polymerization method is suitable since the degree of block polymerization and the degree of random polymerization are properly adjusted by the living polymerization using an organic lithium catalyst and the like.

The silica is contained in the rubber composition for allowing the rubber composition to exhibit the reinforcing effect and the transparency improvement effect on the rubber.

That is, the silica is dispersed in a mixed rubber of the butadiene rubber and the styrene-butadiene rubber and catches rubber molecules around the same to exhibit a reinforcing effect to the whole system.

Further, when the silica is dispersed in the mixed rubber, a larger amount of the silica is dispersed in the styrene-butadiene rubber, since the silica has higher affinity with the styrene-butadiene rubber than with the butadiene rubber. Thus, the silica produces the effect of allowing the refractive index of the butadiene rubber and that of the styrene-butadiene rubber to be approximated to each other.

In this way, the silica contributes to allow the shoe-forming members to exhibit excellent strength and transparency.

For allowing the shoe-forming members to exhibit the effect as described above more significantly, the silica is preferably dispersed in the rubber composition not in a state of aggregation but in a state close to primary particles.

Therefore, as the silica, dry type silica obtained in a form close to primary particles by a dry process such as a combustion process and an arc process is more preferred than wet type silica obtained as agglomerated particles by a wet process such as a precipitation process and a gel process.

More specifically, the silica is preferably fumed silica having an average particle size of 5 nm to 50 nm and a specific surface area by a BET method of 50 $m^2/g$ to 500 $m^2/g$.

Further, for exhibiting the effect as described above more significantly, the silica is preferably contained in the rubber composition in an amount of 35 parts by mass or more and 45 parts by mass or less when the total content of the butadiene rubber and the styrene-butadiene rubber in the rubber composition is set to 100 parts by mass.

For obtaining a shoe-forming member excellent in transparency, the rubber composition contains an organic peroxide crosslinking agent as a crosslinking agent for crosslinking the rubber.

Specific examples of the organic peroxide include 1,1-bis(1,1-dimethylethylperoxy)cyclohexane, 1,1-bis(1,1-dimethylbutylperoxy)cyclohexane, butyl 4,4-bis[(t-butyl)peroxy]pentanoate, dicumyl peroxide, t-butyl-α-cumyl peroxide, 2,5-dimethyl-2,5-bis(t-butylperoxy)hexane, 2,5-bis(t-butylperoxy)-2,5-dimethyl-3-hexyne, dibenzoyl peroxide, bis(4-methylbenzoyl)peroxide, 2,5-dimethyl-2,5-bis(benzoylperoxy)hexane, t-butyl peroxybenzoate, t-hexyl peroxybenzoate, and 1,1-bis(t-butyldioxy)-3,3,5-trimethylcyclohexane.

For allowing a crosslinked rubber constituting a shoe-forming member to exhibit a proper crosslink density, the organic peroxide as a crosslinking agent is preferably contained in the rubber composition in an amount of 0.1 part by mass or more and 2 parts by mass or less, more preferably 0.6 part by mass or more and 0.85 part by mass or less, when the total content of the butadiene rubber and the styrene-butadiene rubber in the rubber composition is set to 100 parts by mass.

Further, for allowing shoe-forming members to exhibit excellent strength and transparency, the rubber composition contains one or more silane coupling agents selected from the group consisting of mercapto silane coupling agents and monosulfide silane coupling agents.

Among these, the mercapto silane coupling agents are components effective in the improvement in dispersibility of the silica, particularly effective in allowing shoe-forming members to exhibit excellent strength.

Examples of the mercapto silane coupling agents which are contained in the rubber composition include mercapto silane coupling agents, such as 2-mercaptoethyltrimethoxysilane, 2-mercaptoethyltriethoxysilane, 2-mercaptoethylmethyldimethoxysilane, 2-mercaptoethylmethyldiethoxysilane, 3-mercaptopropyltrimethoxysilane, 3-mercaptopropyltriethoxysilane, 3-mercaptopropylmethyldimethoxysilane, 3-mercaptopropylmethyldiethoxysilane, 4-mercaptobutyltrimethoxysilane, and 4-mercaptobutyltriethoxysilane; and silane coupling agents derived from these silanes in which a methoxy group or an ethoxy group is replaced with a diol and condensed.

Among them, the silane coupling agents having an ethoxy group or silane coupling agents derived therefrom in which an ethoxy group is replaced with a diol and condensed are preferred.

The monosulfide silane coupling agents are also effective in the improvement in dispersibility of the silica.

Examples of the monosulfide silane coupling agents which are contained in the rubber composition include those represented by the following general formula (1).

[Formula 1]

$$R^1-S-R^2-X \quad (1)$$

In the formula, "$R^1$" represents an alkyl group, an alkenyl group, or an acyl group having 1 to 20 carbon atoms. The alkyl group, the alkenyl group, or the acyl group may have one or more substituents. "$R^2$" represents an alkane diyl group, an alkene diyl group, or a carbonyl group having 1 to 20 carbon atoms. The alkane diyl group, the alkene diyl group, or the carbonyl group may have one or more substituents. "X" represents an alkoxy silyl group represented by the following general formula (2).

[Formula 2]

$$(2)$$

In the formula, "$R^3$", "$R^4$", and "$R^5$" each independently represent a hydrogen atom, an alkyl group having 1 to 4 carbon atoms, or an alkoxy group, and at least one of "$R^3$", "$R^4$", and "$R^5$" is an alkoxy group.

"$R^1$" is preferably an unsubstituted acyl group having 4 to 12 carbon atoms.

"$R^2$" is preferably an unsubstituted alkane diyl group having 2 to 5 carbon atoms.

"X" is preferably a trimethoxysilyl group or a triethoxysilyl group.

That is, the monosulfide silane coupling agent is preferably 3-alkanoylthio-1-propyltrimethoxysilane or 3-alkanoylthio-1-propyltriethoxysilane, which is represented by the following general formula (3) or (4).

[Formula 3]

$$(3)$$

wherein "n" represents an integer of 2 to 10, and "m" represents an integer of 2 to 5.

[Formula 4]

$$(4)$$

wherein "n" represents an integer of 2 to 10, and "m" represents an integer of 2 to 5.

Among the silanes represented by the general formulas (3) and (4), those in which "n" is "6" and "m" is "3" are particularly preferred. Specifically, the monosulfide silane coupling agent is particularly preferably 3-octanoylthio-1-propyltrimethoxysilane or 3-octanoylthio-1-propyltriethoxysilane.

Such a preferred monosulfide silane coupling agent allows a rubber composition to exhibit a plasticizing effect since the silane coupling agent has an alkyl structure having a proper length at molecular terminals, which can impart low hardness to shoe-forming members obtained by crosslinking the rubber composition.

From such a point of view, both the mercapto silane coupling agent and the monosulfide silane coupling agent are preferably contained in the rubber composition of the present embodiment.

Note that sulfur-based silane coupling agents such as a mercapto silane coupling agent and a monosulfide silane coupling agent have been utilized only in a rubber composition using a sulfur crosslinking system and seldom used in a rubber composition using an organic peroxide crosslinking system.

This is because it has been considered that when rubber compositions are crosslinked, sulfur atoms in this type of silane coupling agents easily capture radicals of organic peroxides to deactivate the same to significantly reduce the crosslinking efficiency of organic peroxides.

However, according to the findings by the present inventors, although these silane coupling agents surely tend to slightly reduce the crosslinking efficiency of organic peroxides, there is much advantage in obtaining transparent shoe-forming members.

That is, the present inventors have found a range where the system containing rubber and silica as described above has much advantage due to the reinforcing effect of rubber, the dispersibility improvement effect of silica, and the plasticizing effect of rubber by these silane coupling agents, and where the reduction in crosslinking efficiency therefore hardly poses a problem as a whole.

For example, an alkoxy group at a molecular terminal of the mercapto silane coupling agent chemically bonds to a hydroxy group on the surface of a silica particle, and the mercapto silane coupling agent also chemically bonds to a rubber molecule through a sulfur atom, which is present at the molecular terminal on the opposite side of the alkoxy group.

Therefore, in the present embodiment, there is a range where even if the efficiency of crosslinking by organic peroxides may be reduced to some extent, an advantageous effect can be obtained as a whole by the development of the reinforcing effect of rubber by the mechanism as described above.

Thus, for the purpose of obtaining a crosslinked rubber which is transparent and excellent in strength and is suitable for shoe-forming members, it is effective to add these silane coupling agents to a rubber composition together with organic peroxides.

Note that the amount of silane coupling agents to be blended is generally determined based on a reaction between an inorganic filler and an alkoxy group.

On the other hand, from the reasons as described above, silane coupling agents are preferably contained in the rubber composition of the present embodiment also taking the reinforcement action of rubber into consideration.

Therefore, it is preferred that the rubber composition of the present embodiment contain silane coupling agents in an amount exceeding the amount that has been conventionally considered on the basis of inorganic filler. Specifically, the silane coupling agents are preferably contained in a total amount of 1 part by mass or more based on 100 parts by mass of the total of the butadiene rubber and the styrene butadiene rubber.

With respect to the amount of each silane coupling agent to be blended for more reliably obtaining the effects as described above, the mercapto silane coupling agent is preferably contained in the rubber composition in an amount of 0.1 part by mass or more and 5 parts by mass or less, more preferably 0.5 part by mass or more and 2.5 parts by mass or less, and most preferably 0.5 part by mass or more and 1.0 part by mass or less, when the total content of the butadiene rubber and the styrene-butadiene rubber in the rubber composition is set to 100 parts by mass.

Further, the monosulfide silane coupling agent is preferably contained in the rubber composition in an amount of 1 part by mass or more and 10 parts by mass or less, more preferably 2 parts by mass or more and 5 parts by mass or less, when the total content of the butadiene rubber and the styrene-butadiene rubber in the rubber composition is set to 100 parts by mass.

The rubber composition can further contain materials to be blended other than those described above within the range where the effects of the present invention are not significantly impaired. For example, the rubber composition can optionally contain hardness regulators such as paraffin oil, tackifiers such as terpene resin, antiaging agents, processing aids, inorganic fillers, antibacterial agents, flavoring agents, and the like.

Further, when colored transparent shoe-forming members are produced, the rubber composition may contain coloring agents as a material to be blended other than those described above.

As a method for producing a shoe-forming member using such a rubber composition, a method similar to a conventional method for producing rubber products can be employed.

Examples of the methods for producing shoe-forming member include a method comprising:

(a) a first step of uniformly dispersing raw materials such as a butadiene rubber, a styrene-butadiene rubber, silica, and a silane coupling agent using a kneading apparatus such as a Banbury mixer and a pressurized kneader to prepare a mixture containing these raw materials;

(b) a second step of feeding the mixture obtained in the first step and a crosslinking agent to a calender roll or the like to further uniformly disperse the mixture and form the homogenized mixture into a sheet with the calender roll to thereby prepare a preformed sheet in an unvulcanized state formed of a rubber composition of the present embodiment; and (c) a third step of heat pressing the preformed sheet obtained in the second step with a heat pressing machine equipped with a mold to form a target member shape from the preformed sheet using the mold and cross slink the preformed sheet to prepare a shoe-forming member comprising a crosslinked rubber.

Since the shoe-forming member obtained in this way is excellent in strength and grip properties and excellent in transparency, it can allow shoes to have excellent design.

Further, the shoe-forming member of the present embodiment also has the advantage of being hardly discolored with time because it is formed of a crosslinked rubber comprising the rubber composition as described above.

That is, the shoes provided with the shoe-forming member of the present embodiment in any portion of the shoes with the surface of the member exposed have the advantage that the beautiful appearance thereof is sustainingly exhibited over a long period of time.

Although detailed description beyond the above will not be repeated here, conventionally known technical matters on rubber compositions, shoe-forming members, and the like may be optionally employed in the present invention even if the matters are not directly described in the above.

EXAMPLES

Next, the present invention will be described in more detail by Examples, but the present invention is not limited to these Examples.

(Evaluation A: Rubber Blend Ratio)

The blends of a butadiene rubber (BR) having a number average molecular weight of about 94000 and a weight average molecular weight of about 480000 and a styrene-butadiene rubber (SBR) having a styrene content of 45% by mass were studied in which the amount of silica (dry type silica) was fixed at 35 parts by mass, as shown in Table 1 below.

TABLE 1

|       | Sample A-1 | Sample A-2 | Sample A-3 | Sample A-4 | Sample A-5 |
|-------|------------|------------|------------|------------|------------|
| SBR   | 0          | 15         | 20         | 30         | 40         |
| BR    | 100        | 85         | 80         | 70         | 60         |
| Silica| 35         | 35         | 35         | 35         | 35         |

(*Numerical values in the table are in parts by mass)

Sheet samples prepared using "Sample A-1" to "Sample A-5" were measured for the haze according to JIS K7136: 2000.

Figure 2:
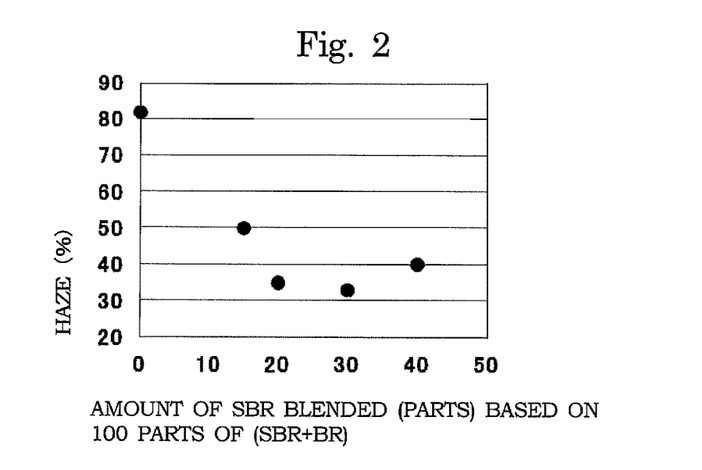
FIG. 2 is a graph showing the relationship between the blending ratio of a rubber and the transparency of a crosslinked rubber.

The results are shown in FIG. 2.

As also can be seen from the FIG. 2, it is important that, for allowing shoe-forming members to exhibit transparency, the content of the butadiene rubber in the rubber composition be 60 parts by mass or more and 80 parts by mass or less based on 100 parts by mass of the total of the butadiene rubber and the styrene-butadiene rubber.

(Evaluation B: Silica Blend Ratio)

The change of haze and hardness (JIS K6301:1975, Spring type hardness tester, Type A, Immediately after the contact) due to the change of the amount of silica was investigated when the ratio of the butadiene rubber to the styrene-butadiene rubber was fixed at 70:30 (mass ratio) as shown in Table 2 contrary to the "Evaluation A".

TABLE 2

|       | Sample B-1 | Sample B-2 | Sample B-3 | Sample B-4 |
|-------|------------|------------|------------|------------|
| SBR   | 30         | 30         | 30         | 30         |
| BR    | 70         | 70         | 70         | 70         |
| Silica| 18         | 28         | 38         | 48         |

(*Numerical values in the table are in parts by mass)

Figure 3:
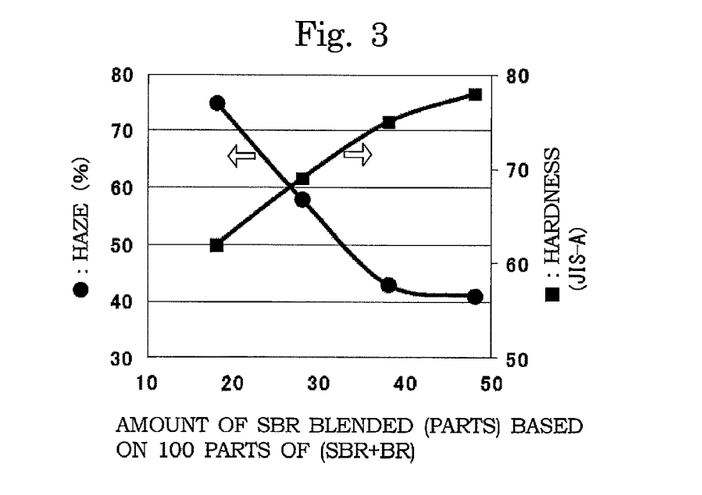
FIG. 3 is a graph showing the relationship between the blending ratio of silica and the transparency and hardness of a crosslinked rubber.

The results are shown in FIG. 3.

From the results shown in FIG. 3, it can be understood that, for allowing shoe-forming members to exhibit low hardness and transparency with good balance, the content of silica in the rubber composition is preferably within a predetermined range.

That is, it can be understood from FIG. 3 that the amount of silica is preferably 35 parts by mass or more and 45 parts by mass or less based on 100 parts by mass of the total of the butadiene rubber and the styrene-butadiene rubber.

(Evaluation C: Reaction between Silane Coupling Agent and Rubber)

Samples containing the butadiene rubber used for preparing Samples A and B and any of the three types of silane coupling agents "CA1" to "CA3" shown in Table 3 below (not containing crosslinking agents) were provided, and the samples were each set in a rotorless curemeter manufactured by EKTRON TEK Co. Ltd. (device name "EKT-20005P") and measured for the change of viscoelasticity (testing machine torque) under a test condition of 140° C.×10 min.

TABLE 3

| Sample C-1 | BR 100 phr (Not containing silane coupling agent) |
|------------|---------------------------------------------------|
| Sample C-2 | BR 100 phr + (CA1) Vinyl silane coupling agent (general-purpose product) 1.00 phr |
| Sample C-3 | BR 100 phr + (CA2) Mercapto silane coupling agent (general-purpose product) 1.30 phr |
| Sample C-4 | BR 100 phr + (CA3) Monosulfide silane coupling agent (general-purpose product) 1.32 phr |

Figure 4:
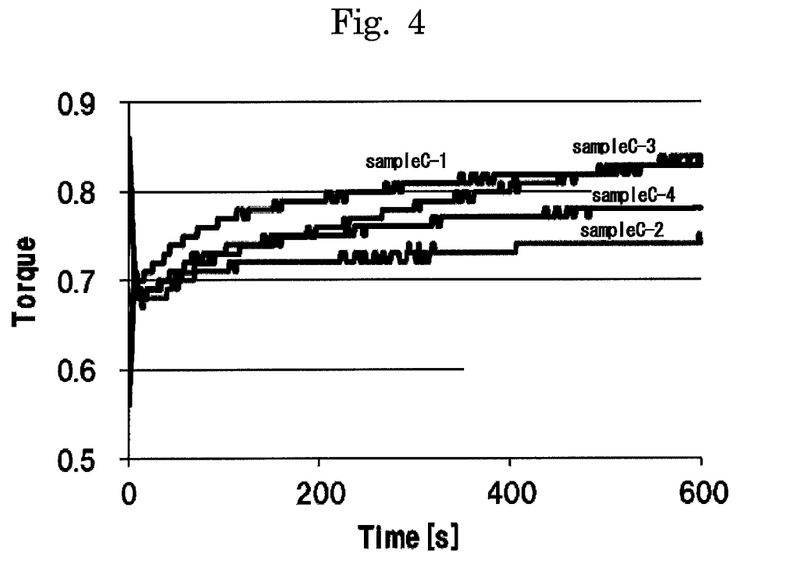
FIG. 4 shows the results of viscoelasticity measurement of rubber compositions with a curing characteristics-testing machine (without a crosslinking agent).

The results are shown in FIG. 4.

As also can be seen from the FIG. 4, the torque curves of the samples containing the vinyl silane coupling agent (CA1) and the monosulfide silane coupling agent (CA3) showed a behavior similar to that of the sample which does not contain a silane coupling agent. On the other hand, "Sample C-3" containing the mercapto silane coupling agent (CA2) showed a tendency that the torque increases with the lapse of heating time.

It is considered that such a phenomenon was observed because the mercapto silane coupling agent reacted with rubber to produce chemical bonds.

(Evaluation D: Influence on Crosslinking Agent)

As shown in Table 4 below, an organic peroxide crosslinking agent (material name: 1,1-bis(t-butyldioxy)-3,3,5-trimethylcyclohexane) was added to the "Sample C-1" to "Sample C-4", and the resulting samples were measured for the change of viscoelasticity (torque) under a test condition of 160° C.×10 min using a rotorless curemeter (device name "EKT-2000SP") in the same manner as in the above "Evaluation C".

TABLE 4

| Sample D-1 | Sample C-1 (BR 100 phr) + Crosslinking agent (0.75 phr) |
|------------|----------------------------------------------------------|
| Sample D-2 | Sample C-2 (BR 100 phr + CA1 1.00 phr) + Crosslinking agent (0.75 phr) |
| Sample D-3 | Sample C-3 (BR 100 phr + CA2 1.30 phr) + Crosslinking agent (0.75 phr) |
| Sample D-4 | Sample C-4 (BR 100 phr + CA3 1.32 phr) + Crosslinking agent (0.75 phr) |

Figure 5:
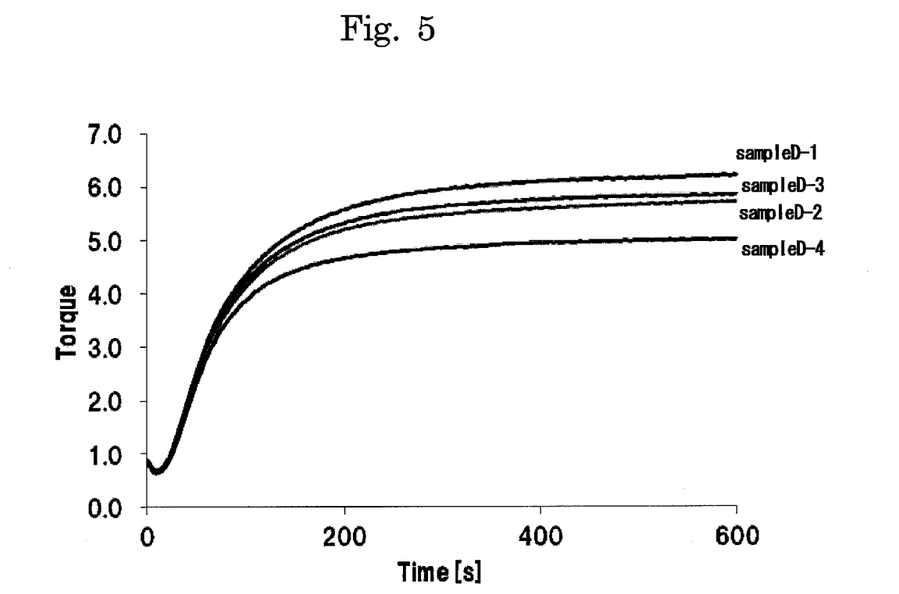
FIG. 5 shows the results of viscoelasticity measurement of rubber compositions with a curing characteristics-testing machine (with a crosslinking agent).

The results are shown in FIG. 5.

In FIG. 5, the "Sample D-4" using the monosulfide silane coupling agent (CA3) has a greatly reduced torque compared with the samples including the sample which does not contain a silane coupling agent. Thus, the plasticizing effect of the monosulfide silane coupling agent (CA3) can be verified from FIG. 5.

Note that, in FIG. 4 above, "Sample C-2" using the vinyl silane coupling agent (CA1) showed a lower torque than that of "Sample C-4" using the monosulfide silane coupling agent (CA3), but, in FIG. 5, "Sample D-2" showed a higher torque than that of "Sample D-4", resulting in showing a value close to that of "Sample D-3" using the mercapto silane coupling agent (CA2).

This is probably because the crosslinking efficiency of an organic peroxide is slightly reduced when the sulfur-based silane coupling agents (CA2, CA3) are used, while such a reduction in crosslinking efficiency is not observed when the vinyl silane coupling agent (CA1) is used.

(Evaluation E: Evaluation of Strength, Transparency, and Yellowing Resistance)

Crosslinked rubber sheets were prepared according to the formulation shown in Table 5 below and evaluated for the following items.

The results are collectively shown in Table 5.

(Evaluation Items)
1) Hardness: JIS K6301:1975, Spring type hardness tester, Type A, Immediately after the contact
2) Tensile strength: JIS K6301:1975, Dumbbell No. 2 Type, "Tensile strength at break"
3) Elongation: JIS K6301:1975, Dumbbell No. 2 Type, "Elongation at break"
4) Tear strength: JIS K6301:1975, Type B
5) DIN abrasion: JIS K6264-2:2005 (Method B, Temperature: 23° C., Force applied to test piece: 10 N, Abrasion distance: 40 m)
6) NOx:
  Test conditions: $NO_2$: 1300 ppm, Installed a beaker containing hot water, Time: 18 hr
  Evaluation method: "Δb" before and after exposure is measured by Lab colorimeter.
7) High temperature and High humidity:
  Test conditions: 80° C.×95% RH, Time: 48 hr
  Evaluation method: "Δb" before and after exposure is measured by Lab colorimeter.

TABLE 5

|  | Sample E-1 | Sample E-2 | Sample E-3 | Sample E-4 | Sample E-5 | Sample E-6 | Sample E-7 |
|---|---|---|---|---|---|---|---|
| SBR/BR/Silica | 30/70/38 | 30/70/38 | 30/70/38 | 30/70/38 | 30/70/38 | 30/70/38 | 30/70/38 |
| Vinyl silane coupling agent (CA1) | 2.5 | 3.0 | — | — | — | — | — |
| Mercapto silane coupling agent (CA2) | — | — | 0.5 | — | 0.5 | 0.5 | 1.0 |
| Monosulfide silane coupling agent (CA3) | — | — | — | 3.0 | 3.0 | 5.0 | 3.0 |
| Organic peroxide | 0.65 | 0.75 | 0.75 | 0.75 | 0.75 | 0.75 | 0.75 |
| Hardness/(JIS-A) | 77 | 73 | 72 | 65 | 68 | 66 | 70 |
| Tensile strength/(kgf/cm$^2$) | 188 | 191 | 149 | 171 | 179 | 156 | 176 |
| Elongation/(%) | 607 | 540 | 530 | 790 | 630 | 600 | 580 |
| Tear strength/(kgf/cm) | 43 | 44 | 43 | 35 | 47 | 46 | 42 |
| DIN abrasion/(mm$^3$) | 60 | 49 | 45 | 69 | 36 | 37 | — |
| Transparency (Haze)/(%) | 12 | 16 | 18 | 23 | 16 | 19 | 17 |
| Yellowing resistance: NOx | 5.8 | 3.3 | 5.1 | 1.2 | 1.7 | 1.1 | — |
| Yellowing resistance: high temperature and high humidity | 3.1 | 3.5 | 2.8 | 1.4 | 0.7 | 0.5 | — |

It can be observed from Table 5 that "Sample E-3", "Sample E-5", and "Sample E-6" using the mercapto silane coupling agent (CA2) are excellent in abrasion resistance.

Further, "Sample E-1" and "Sample E-2" using the vinyl system silane coupling agent (CA1) had a hardness of 73 and 77, respectively, while "Sample E-3" to "Sample E-7" using the mercapto silane coupling agent (CA2) and/or the monosulfide silane coupling agent (CA3) achieved a low hardness of around 70.

Particularly, significant reduction in hardness was observed for "Sample E-4" to "Sample E-7" using the monosulfide silane coupling agent (CA3).

Therefore, it is expected that when outer soles are formed of rubber compositions as shown in "Sample E-3" to "Sample E-7", shoes having little feeling of pushing up and excellent grip force will be able to be obtained.

Further, it was also verified by the above evaluation that a crosslinked rubber having suppressed yellowing was able to be obtained by using the mercapto silane coupling agent (CA2) and/or the monosulfide silane coupling agent (CA3).

That is, it is considered that when outer soles are formed of rubber compositions as shown in "Sample E-3" to "Sample E-7", it will be able to obtain shoes which exhibit not only low hardness and grip force but also excellent design sustainingly over a long period of time.

Note that, in the above "Evaluation D", it was verified that the vinyl silane coupling agent (CA1) is more advantageous in terms of the crosslinking efficiency of organic peroxide crosslinking agents.

On the other hand, in the "Evaluation E", it was observed that although the mercapto silane coupling agent (CA2) and the monosulfide silane coupling agent (CA3) were disadvantageous in terms of crosslinking efficiency, an advantageous effect was exhibited.

Particularly, it was verified that the result of excellent balance between low hardness and abrasion resistance was able to be obtained by using the mercapto silane coupling agent (CA2) and the monosulfide silane coupling agent (CA3) in combination.

(Evaluation F: Change of Butadiene Rubber)

Until now, the evaluation was performed using a butadiene rubber having a number average molecular weight of about 94000 and a weight average molecular weight of about 480000 (BR1: Mw/Mn≈5.1). However, here, the evaluation was performed on the same items as in the above "Evaluation E" using a butadiene rubber having a slightly larger weight average molecular weight and a sharp molecular weight distribution (BR2: Mn≈240000, Mw≈580000, Mw/Mn≈2.4).

The formulation used for the evaluation is as shown in Table 6 below.

The results are shown in Table 6 below in combination with the results of the above "Sample E-3" to "Sample E-5".

TABLE 6

|  | Sample E-4 | Sample F-1 | Sample E-5 | Sample F-2 | Sample E-3 | Sample F-3 |
|---|---|---|---|---|---|---|
| SBR/BR1/silica (molecular weight of BR: small) | 30/70/38 | — | 30/70/38 | — | 30/70/38 | — |
| SBR/BR2/silica (molecular weight of BR: large) | — | 30/70/38 | — | 30/70/38 | — | 30/70/38 |
| Mercapto silane coupling agent (CA2) | — | — | 0.5 | 0.5 | 0.5 | 0.5 |
| Monosulfide silane coupling agent (CA3) | 3.0 | 3.0 | 3.0 | 3.0 | — | — |
| Organic peroxide | 0.75 | 0.45 | 0.75 | 0.45 | 0.75 | 0.45 |
| Hardness/(JIS-A) | 65 | 66 | 68 | 70 | 72 | 71 |
| Tensile strength/(kgf/cm$^2$) | 171 | 183 | 179 | 204 | 149 | 196 |
| Elongation/(%) | 790 | 760 | 630 | 640 | 530 | 560 |
| Tear strength/(kgf/cm) | 35 | 38 | 47 | 46 | 43 | 50 |
| DIN abrasion/(mm$^3$) | 69 | — | 36 | 37 | 45 | 34 |
| Transparency (Haze)/(%) | 23 | 17 | 16 | 18 | 18 | 21 |

It was verified from this evaluation that the effect verified in "Evaluation E" was also obtained even when the rubber type was changed as described above.

(Evaluation G: Change of the Amount of Mercapto Silane Coupling Agent)

The change of the characteristics by the change of the amount of the mercapto silane coupling agent was investi gated with the system using the butadiene rubber having a large molecular weight.

The formulation used for the evaluation is as shown in Table 7 below.

The results are shown in Table 7 below in combination with the results of the above "Sample F-3".

TABLE 7

|  | Sample F-3 | Sample G-1 | Sample G-2 | Sample G-3 | Sample G-4 |
|---|---|---|---|---|---|
| SBR/BR2/silica (molecular weight of BR: large) | 30/70/38 | 30/70/38 | 30/70/38 | 30/70/38 | 30/70/38 |
| Mercapto silane coupling agent (CA2) | 0.5 | 0.8 | 1.6 | 2.3 | 3.0 |
| Organic peroxide | 0.45 | 0.45 | 0.45 | 0.45 | 0.45 |
| Hardness/(JIS-A) | 71 | 71 | 74 | 75 | 74 |
| Tensile strength/(kgf/cm$^2$) | 196 | 178 | 163 | 155 | 145 |
| Elongation/(%) | 560 | 510 | 380 | 350 | 300 |
| Tear strength/(kgf/cm) | 50 | 43 | 40 | 42 | 53 |
| DIN abrasion/(mm$^3$) | 34 | 43 | 29 | 27 | — |
| Transparency (Haze)/(%) | 21 | 23 | 25 | 27 | 18 |

In this evaluation, the abrasion resistance of the crosslinked rubber tended to be improved with the increase of the amount of the mercapto silane coupling agent blended, while the hardness increased and the elongation value was largely reduced from "Sample G-1" to "Sample G-2". Thus, it was found from this evaluation that the amount of the mercapto silane coupling agent to be blended was preferably about 0.5 part by mass or more and about 1.0 part by mass or less.

(Evaluation H: Change of the Amount of Crosslinking Agent)

As shown in Table 8 below, the amount of the organic peroxide as a crosslinking agent was changed to investigate the characteristics of crosslinked rubbers.

The results are shown in Table 8 below.

TABLE 8

| Formulation (parts by mass) | | Sample H-1 | Sample H-2 | Sample H-3 | Sample H-4 | Sample H-5 |
|---|---|---|---|---|---|---|
| SBR/BR1/silica (molecular weight of BR: small) | | 30/70/38 | 30/70/38 | 30/70/38 | 30/70/38 | 30/70/38 |
| Process oil | | 6 | 6 | 6 | 6 | 6 |
| Mercapto silane coupling agent (CA2) | | 0.5 | 0.5 | 0.5 | 0.5 | 0.5 |
| Monosulfide silane coupling agent (CA3) | | 3.0 | 3.0 | 3.0 | 3.0 | 3.0 |
| Heat stabilizer (hindered phenol-based) | | 0.2 | 0.2 | 0.2 | 0.2 | 0.2 |
| Heat stabilizer (phosphorus-based) | | 0.2 | 0.2 | 0.2 | 0.2 | 0.2 |
| Ultraviolet absorber (benzotriazole-based) | | 0.1 | 0.1 | 0.1 | 0.1 | 0.1 |
| Organic peroxide | | 0.50 | 0.55 | 0.60 | 0.75 | 0.85 |
| Evaluation items | | | | | | |
| Transparency | Haze | 16 | 15 | 17 | 16 | 18 |
| Hardness | JIS-A | 65 | 63 | 66 | 68 | 69 |
| Specific gravity |  | 1.08 | — | — | 1.08 | — |
| Tensile strength | kgf/cm$^2$ | 138 | 186 | 180 | 179 | 182 |
| Elongation | % | 570 | 670 | 610 | 630 | 580 |
| Tear strength | kgf/cm | 37 | 39 | 43 | 47 | 43 |
| DIN abrasion | mm$^3$ | — | — | — | 36 | 37 |

It was found from the "Evaluation H" that, for obtaining a crosslinked rubber excellent in tear strength, a crosslinking agent was preferably contained in a rubber composition in an amount of 0.6 part by mass or more and 0.85 part by mass or less based on 100 parts by mass of rubber.

As described above, it is found that, according to the present invention, shoe-forming members can exhibit excellent transparency, as well as excellent strength and low hardness.

REFERENCE SIGNS LIST

1: Shoe, 2: Upper material, 3: Midsole, 4: Outer sole

The invention claimed is:

1. A shoe-forming member comprising:
a rubber composition containing a butadiene rubber (BR), a styrene-butadiene rubber (SBR), silica, a silane coupling agent, and a crosslinking agent, the rubber composition being crosslinked, wherein the content of the butadiene rubber in the rubber composition is 60 parts by mass or more and 80 parts by mass or less based on 100 parts by mass of the total of the butadiene rubber and the styrene-butadiene rubber, wherein the silane coupling agent contained in the rubber composition comprises a mercapto silane coupling agent, and wherein the crosslinking agent comprises an organic peroxide crosslinking agent.

2. The shoe-forming member according to claim 1, wherein the silica comprises fumed silica, and wherein the silica is contained in the rubber composition in an amount of 35 parts by mass or more and 45 parts by mass or less based on 100 parts by mass of the total of the butadiene rubber and the styrene-butadiene rubber.

3. The shoe-forming member according to claim 1, wherein the content of styrene in the styrene-butadiene rubber is 40% by mass or more and 50% by mass or less.

4. A shoe comprising an outer sole comprising the shoe-forming member according to claim 1.

5. A shoe-forming member comprising:
a rubber composition containing a butadiene rubber (BR), a styrene-butadiene rubber (SBR), silica, a silane coupling agent, and a crosslinking agent, the rubber composition being crosslinked, wherein the content of the butadiene rubber in the rubber composition is 60 parts by mass or more and 80 parts by mass or less based on 100 parts by mass of the total of the butadiene rubber and the styrene-butadiene rubber, wherein the silane coupling agent contained in the rubber composition comprises (i) one or more kinds of a mercapto silane coupling agent, and (ii) one or more kinds of a monosulfide silane coupling agent, wherein the crosslinking agent comprises an organic peroxide crosslinking agent.

6. A method for producing a shoe-forming member, comprising:

preparing a rubber composition containing a butadiene rubber (BR), a styrene-butadiene rubber (SBR), silica, a silane coupling agent, and a crosslinking agent, then allowing the rubber composition to form the shape of the member and crosslinking the rubber composition to produce the shoe-forming member, wherein wherein the content of the butadiene rubber in the rubber composition is 60 parts by mass or more and 80 parts by mass or less based on 100 parts by mass of the total of the butadiene rubber and the styrene-butadiene rubber, wherein the silane coupling agent contained in the rubber composition comprises a mercapto silane coupling agent;

wherein the crosslinking agent comprises an organic peroxide crosslinking agent, and wherein the preparation of the rubber composition comprises:

a first kneading step of kneading a first mixture containing the butadiene rubber, the styrene-butadiene rubber, the silica, and the silane coupling agent; and a second kneading step of kneading a second mixture containing the kneaded material obtained in the first kneading step and the crosslinking agent.

* * * * *